United States Patent Office

3,308,026
Patented Mar. 7, 1967

3,308,026
PROCESS FOR THE PRODUCTION AND RECOVERY OF THE KALLIKREIN-INACTIVATOR FROM PROTEINACEOUS HORMONE WASTES
Fritz Schultz, Wuppertal-Elberfeld, Germany, assignor to Farbenfabriken Bayer Aktiengesellschaft, Leverkusen, Germany, a corporation of Germany
No Drawing. Filed Jan. 13, 1964, Ser. No. 337,125
7 Claims. (Cl. 167—74)

This application is a continuation in part of application Serial No. 245,399, filed December 18, 1962, and now abandoned.

The present invention relates, in general, to a unique process for the recovery of the inactivator for the circulatory harmone kallikrein from normally waste materials resulting from established processes for the recovery of a widely used proteinaceous hormone. More particularly, the invention involves the provision of a new and improved process for the production and recovery of the kallikrein-inactivator from waste fractions of pancreas juice glands resulting from processing techniques used in the production of the protein hormone insulin.

It is now well established that an inactivator of kallikrein can be isolated and recovered from the most diverse animal organs including, for example, the parotid, pancreas, lung, liver, spleen and lymphatic glands, and even the blood. Thus, in German Patent No. 1,084,433 there is described a process for the production of this hormone in which comminuted animal organs containing the same, and preferably the parotid, pancreas, liver or lungs, are extracted with aqueous solutions of salts or hydroxides of an alkaline earth metal or of alkali metal salts, conveniently containing water-miscible organic solvents, and preferably methanol. The resulting extract is precipitated with a ketone, preferably acetone, and in the presence of a finely-subdivided inert carrier substance, the separated precipitate is extracted with water, preferably after drying, the residual protein is quantitatively precipitated from the solution with a suitable protein-precipitating agent such as sulphosalicylic acid, and the excess of the latter agent is then removed from the solution remaining after separation of the precipitate by means of ion-exchangers.

In German Patent No. 1,148,352 (currently application Serial No. F 31463 IVa/30h) there is described another process for the production of the kallikrein-inactivator from the same types of animal organs, wherein use is made of aqueous solutions of salts with trivalent cations or with select bivalent cations excluding the alkaline earth metals, expediently containing water-miscible solvents, for extracting the inactivator from the organs.

In addition to the foregoing, German Patent No. 954,284 describes still another process for the recovery of kallikrein-inactivator from lymphatic or parotid glands of ruminants, wherein the proteinaceous compounds are precipitated from the aqueous or acetic acid extracts of degreased and dried glands with trichloroacetic acid. The solutions of the inactivator are then adjusted to a weakly alkaline reaction and treated with an equal volume of alcohol, whereupon inactive substances in solution with the inactivator are precipitated, the filtrate is adjusted to pH 6.0 with acetic acid, concentrated in vacuo, extracted with ether, and the inactivator is finally precipitated by use of approximately ten times its amount of alcohol.

A further process for the recovery of the kallikrein-inactivator from lymphatic and parotid glands, pancreas, or blood has been described in German Patent No. 950,-959, whereby fat is first removed from the fresh organs by treatment twice with five times their volume of acetone, they are then extracted hot with dilute alcohol, and the extracts are concentrated in vacuo and shaken-out with ether. The inactivator is precipitated from the aqueous phase with alcohol, acetone or another organic solvent miscible with water, the precipitate is dissolved in dilute acetic acid, inactive matter present with the inactivator is removed by adjusting the solution to a weakly alkaline condition, and the kallikrein-inactivator is precipitated once again with alcohol, acetone, or another organic solvent miscible with water.

German Patent No. 956,097 further teaches that the kallikrein-inactivator can also be recovered in a manner analogous to the foregoing from liver, spleen, or colostrum.

Still other processes for the recovery of the kallikrein-inactivator, particularly from the liver, have been described in German Patents Nos. 1,014,288 and 1,011,576. In accordance with the process of the former patent, ox liver is homogenized, extracted with dilute aqueous trichloroacetic acid which is removed by continuous extraction with ether. The inactivator is then precipitated with saturated ammonium sulphate solution, the precipitate is dissolved in water, the inactivator is re-precipitated with picric acid. The resulting picrate is then decomposed with dilute acid, and this solution is then chromatographed by permitting it to pass first over a weakly basic ion-exchanger and then over a weakly acidic ion-exchanger, on which the inactivator is adsorbed for eventual elution therefrom by acid media.

In the process of the latter German Patent (No. 1,011,-576), the ammonium sulphate and picric acid precipitation is merely replaced by a precipitation stage effected with acidic acetone.

The process of the present invention, as indicated hereinabove, is based on our discovery that the kallikrein-inactivator can be produced and recovered from the waste fractions resulting from the processing of pancreas juice glands for the recovery of insulin, in lieu of the conventional fresh glands heretofore considered necessary as starting material for its production. Such waste fractions include, on the one hand, the precipitate formed by neutralization of the acidic alcoholic pancreas extract via conventional insulin recovery techniques and, on the other hand, the mother liquor remaining after the separation of crude insulin from the aqueous solution with 20 to 25 percent of sodium chloride.

The aforesaid precipitate, which was heretofore discarded as a worthless waste fraction, is generally obtained when the acidic alcoholic pancreas extract is treated with ammonia until established at a pH value within the range of from 7–8.

As will appear readily, the present invention affords, therefore, the means for separating and recovering the kallikrein-inactivator from a readily available, inexpensive starting material which contains the hormone in amounts substantially equivalent to those present, for example, in the parotid gland of the ox as commonly employed for its production via known processing techniques. Of course, the concentration of the inactivator will vary with the particular species of animal from which the glands are obtained.

In the utlization of the aforesaid waste-precipitate from insulin recovery techniques pursuant to the process of the present invention, the kallikrein-inactivator is extracted and purified by means of precisely the same processing measures as described above in connection with the processing of conventional starting materials.

The amounts of the inactivator present in the waste sodium chloride mother liquor following separation of the crude insulin will differ, also, in accordance with the animal species from which the processed glands originate. This is due to the fact that the amounts of hormone present in the acidic alcoholic pancreas extract which are precipitated by neutralization or by precipitation with ammonia are greater for cattle and calves, for example, then in the case of pigs. Accordingly, in the processing of organ of pig-origin, most of the kallikrein-inactivator will be found in the sodium chloride mother liquors. In order to effect recovery of the inactivator from such solutions pursuant to the process of the present invention, the main portion of the sodium chloride is suitably removed, and, thereafter, processing is effected precisely in accordance with any of the known recovery techniques described hereinbefore. For example, a large part of the salt contaminant can be removed by treatment of the waste solution with five times its volume of alcohol, and the kallikrein-inactivator is precipitated from the residual alcohol solution with ammonia. Thereafter, the usual purification measures are followed directly, and yield inactivator preparations which have been found to satisfy all clinical requirements with respect to activity and purity as established for the products derived from fresh glands and the like.

In the latter connection, it is somewhat surprising that the kallikrein-inactivator can be produced in the manner described, in that, for example, it has been established heretofore that a trypsin-inhibitor may be prepared from sodium chloride solutions of beef pancreas [Karzal et al.; J. Am. Chem. Soc. 70, 3034 (1948)], but this product cannot be dialyzed, and also differs basically in chemical structure from the kallikrein-inactivator.

As is now well established, the kallikrein-inactivator finds utility as an injectable therapeutic agent for use in the preventative and control therapy of pancreatic disturbances as, for example, for pre- and post-surgical prevention and control of accute pancreatitis stemming from operative complications, and in the control of chronis pancreatitis of non-surgical origin.

It is believed that the invention may be best understood by reference to the following specific examples illustrating the application of the foregoing principles and procedures in the production and recovery of kallikrein-activator from typical waste insulin-residues of the type described:

EXAMPLE I

Five (5) kilograms of a moist precipitate, obtained by treating an acidic alcoholic extract of cattle pancreas with ammonia at a pH up to 7.5, was introduced into a solution of 150 grams of calcium chloride in 2.2 liters of water and 12.8 liters of methanol, and the resulting solution was heated to 40° C. with stirring for one hour. The mixture was then cooled down to 10° C., and the liquid was separated from the residue on a filter press or by means of a centrifuge. The residue was wased with 1.5 liters of 70 percent methanol and the clarified filtrates were combined.

Fifty (50) grams of a filtering aid were then added to the solution, with vigorous stirring, and 55 liters of acetone were allowed to run in. The stirrer was switched-off after one-half hour, and the filtering aid charged with the kallikrein-inactivator settled at the bottom of the reaction vessel. The clear supernatant solution was siphoned off and rejected, the residue was centrifuged, rinsed with 600 cubic centimeters of acetone, and then dried in air. The resulting dry powder was extracted for 10 minutes with 260 cubic centimeters of redistilled water. The kallikrein-inactivator dissolved, and the filtering aid was filtered off with suction and then rinsed with 250 cubic centimeters of redistilled water.

A sufficient quantity of a 20 percent aqueous sulphosalicyclic acid solution was introduced, with stirring, into the combined filtrates until removal of protein was complete. The precipitate was filtered-off with suction and rejected; the desired kallikrein-inactivator being present in the solution.

The excess of the precipitating agent as well as some salts still present in the solution were removed by treatment with ion-exchangers. It was found, for example that a mixture of the anion-exchanger "Amberlite IRA 410" (tradename—Rohm and Haas) with the cation-exchanger "Amberlite IR 120" (tradename—Rohm and Haas) was entirely suitable for this purpose.

There was recovered a colorless solution containing $17.5 \times 10^5$ kallikrein-inactivator units (KIU) (1 KIU is linked to 1.5 γ of organic substance).

EXAMPLE II

Five (5) kilograms of a moist precipitate, which was obtained during insulin manufacture by neutralization of the acidic, alcoholic pancreas extract, were extracted with a solution consisting of 150 grams of manganous chloride in 2.2 liters of water and 12.8 liters of methanol, with stirring at 40° C. for one hour, and the solution, obtained following separation, was further processed by acetone precipitation, protein removal, and ion-exchanger treatment, in accordance with the procedure described in Example I.

The resultant end-product contained $1.25 \times 10^6$ KIU with a degree of purity of 1.7 γ/KIU.

EXAMPLE III

One (1) kilogram of a precipitate from the acidic-alcoholic pancreas extract described in Examples I and II was stirred with 1600 cubic centimeters of 1 N acetic acid and 2400 cubic centimeters of 96 percent ethanol at 50° C. for two hours. Following separation of the residue, the solution was concentrated in vacuo to one liter, and then extracted by shaking with an equal volume of ether, at which point dark coloring matter and fat passed into the ether. The aqueous part was precipitated with three (3) times its amount of acetone, the precipitate was dissolved in weak acetic acid and then adjusted to a weakly alkaline reaction with ammonia, whereby inactive residual substances were precipitated. The kallikrein-inactivator was then precipitated from the solution with five (5) times its amount of alcohol. The yield amounted to $1.9 \times 10^5$ KIU with the degree of purity being 3.1 γ/KIU.

What is claimed is:

1. In a method wherein pancreas gland material is treated to provide an acidic alcoholic pancreas extract containing insulin, said extract is neutralized to form a discardable precipitate and an aqueous solution, said aqueous solution is treated with a 20 to 25 percent sodium chloride solution to produce crude insulin and a discardable mother liquor from which insulin is separated, the improvement which comprised treating a said discardable material with an alcoholic reagent to produce a solution containing kallikrein-inactivator in recoverable form, said alcoholic reagent consisting essentially of alcohol in case of the discardable mother liquor and in the case of the discardable precipitate being selected from the group consisting of an alcoholic salt solution and alcoholic acetic acid.

2. The method of claim 1 in which the alcohol solution of kallikrein-inactivator produced by treating said discardable mother liquor with alcohol is treated with ammonia to precipitate the kallikrein-inactivator.

3. The method of claim 1 in which the extract resulting from treating said discardable precipitate with an alcoholic salt solution is treated with a ketone in the presence of a finely divided inert carrier substance, to precipitate crude kallikrein-inactivator on said carrier substance, crude inactivator is extracted from said carrier by water and the resulting solution is treated with a deproteinizing agent.

4. The method of claim 3 in which said alcohol is methanol.

5. The method of claim 3 in which said deproteinizing agent is sulfosalicyclic acid.

6. The method of claim 1 in which the extract resulting from treating said discardable precipitate with alcoholic acetic acid is concentrated in vacuo and treated with ether to remove fat, the aqueous phase resulting from ether treatment is treated with acetone, and kallikrein-inactivator is recovered from the resulting acetone phase by precipitation with alcohol.

7. The method of claim 6 in which the alcohol is ethanol.

References Cited by the Examiner

UNITED STATES PATENTS 2,424,401  7/1947  Lesuk _____ 167—74

OTHER REFERENCES

Gardner et al.: American Journal of Physiology, vol. 142, No. 4, pp. 541–543, November 1944.

ALBERT T. MEYERS, *Primary Examiner.*

JULIAN S. LEVITT, *Examiner.*

LEROY B. RANDALL, *Assistant Examiner.*